United States Patent [19]
Mutschelknauss et al.

[11] 3,736,918
[45] June 5, 1973

[54] METHOD AND APPARATUS FOR IN VIVO MEASURING BLOOD VELOCITY IN CAPILLARIES

[75] Inventors: Ralf E. Mutschelknauss, Roxel; Johannes P. Schumann, Munster, both of Germany; Manfred Bergman, Geneve, Switzerland

[73] Assignee: Institut de Recherche Woog, Geneve, Switzerland

[22] Filed: Oct. 5, 1970

[21] Appl. No.: 78,107

[30] Foreign Application Priority Data

Oct. 2, 1970 Switzerland..................14670/70

[52] U.S. Cl..................128/2.05 F, 178/7.1, 356/28, 356/39, 356/167
[51] Int. Cl..................................................A61b 5/02
[58] Field of Search....................128/2 A, 2 G, 2 L, 128/2 R, 2 S, 2.05 A, 2.05 D, 2.05 M, 2.05 P, 2.05 Q, 2.05 R, 2.05 V, 2.05 F; 356/27, 28, 39, 167; 178/7.1

[56] References Cited

OTHER PUBLICATIONS

Schumann, "Zeitschrift fur Wissenschatliche Mikvoscopie und Mikvoskopische Technik," V. 70, No. 1, 1970, pp. 1–11.

Monro, "Bibliography of Anatomy," Vol. 4, pp. 34–45, 1964.

*Primary Examiner*—William E. Kamm
*Attorney*—Lane, Aitken, Dunner & Ziems

[57] ABSTRACT

A non-destructive method and apparatus for measuring blood flow for use, for example, in objectively evaluating massaging effects on skin and mucous membranes, for example the effects of a massage of the gingiva by dental devices. An area containing a blood vessel to be investigated is intravitally sensed to provide a magnified image of the area which is continuously recorded. The velocity of the blood flow in the blood vessel is quantitatively sensed from the reproduced magnified image. In a preferred embodiment, the blood vessel is sensed by the use of an intravital microscope in combination with a split opaque illuminator to provide a magnified image of the blood vessel for recording, for example, by a videotape recorder. The recorded videotape image is reproduced on a suitable screen and the velocity of blood flow is quantitatively sensed by causing a spot of light to traverse the screen at about the same rate of the blood flow appearing on the screen. The rate of the traverse of the flying spot indicates the velocity of the blood flow. By sensing the difference in the velocity of the blood flow before and after massaging of the gingiva by a dental device, the effect of the massage may be objectively determined.

27 Claims, 6 Drawing Figures

INVENTORS
RALF E. MUTSCHELKNAUSS
JOHANNES P. SCHUMANN &
MANFRED BERGMAN

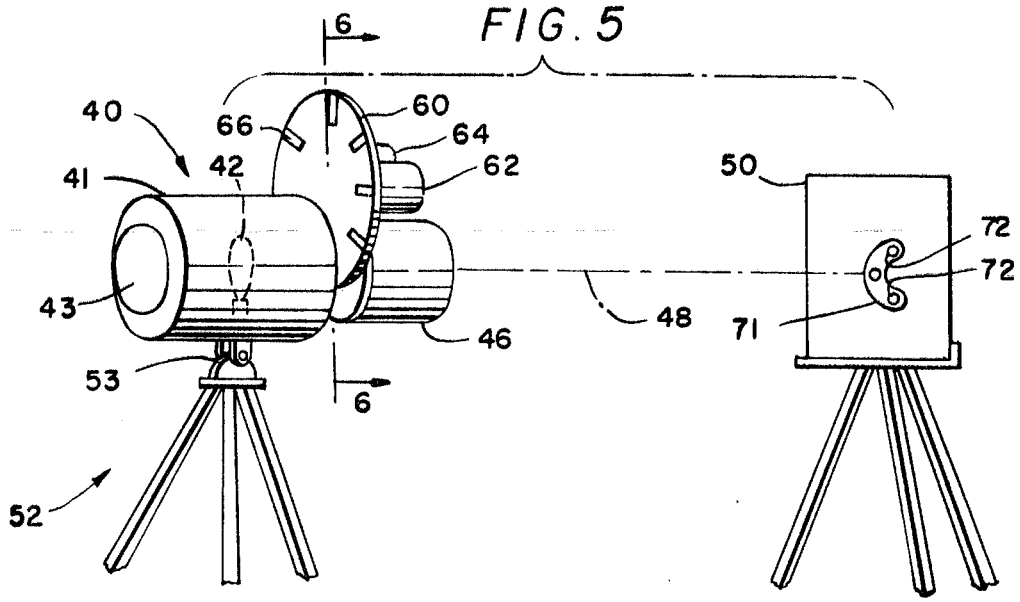
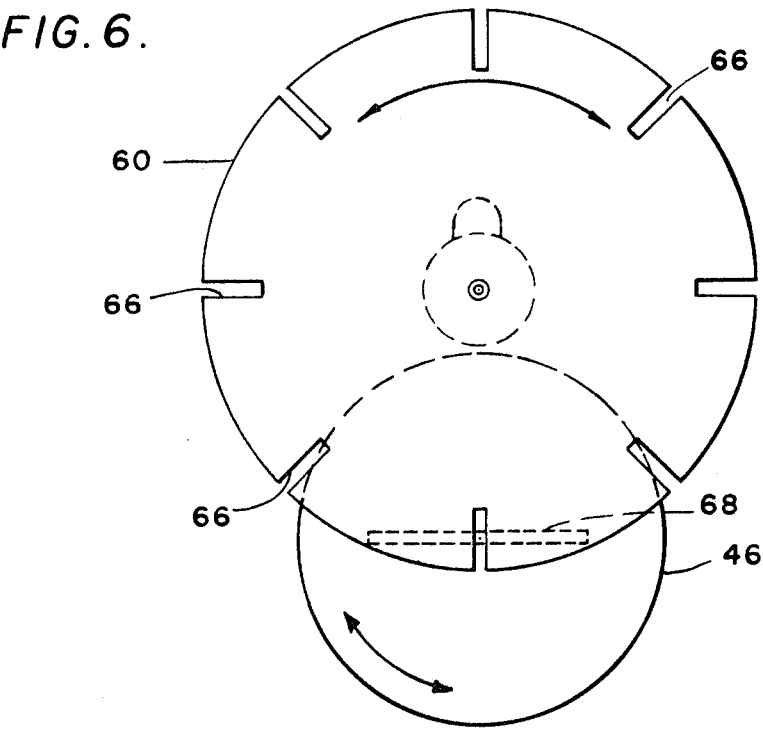

METHOD AND APPARATUS FOR IN VIVO MEASURING BLOOD VELOCITY IN CAPILLARIES

BACKGROUND OF THE INVENTION

This invention relates to a method and apparatus for non-destructively measuring blood flow in a blood vessel. More particularly, this invention relates to a non-destructive, intravital method and apparatus for measuring capillary blood flow by causing a spot of light to traverse a projected image of the area under investigation at about the rate of the flow of blood through the blood vessel in the image. Still more particularly, this invention relates to a non-destructive, intravital method and apparatus for measuring objectively the effects of massaging the gingiva by dental devices by determining the velocity of blood flow through capillaries in the gingiva.

For a long period of time, it has been known that gingival massage is a satisfactory method to treat and prevent gingival and periodontal disease. Moreover, the importance of preventing and treating gingival and periodontal conditions to prevent loss of teeth has long been recognized. While factors leading up to gingival and periodontal conditions are also well known, the prevention and treatment of those conditions depends to a large degree upon the patient. Thus, dental hygiene is a primary factor in the prevention and a large factor in the treatment of those conditions. Since the practice of dental hygiene is virtually solely dependent upon the patient operating generally at home and unsupervised by the treating dentist, the means and methods of dental hygiene must be simple, precise, and meaningful, i.e. supported by accurate and objective medical assessment. However, it has been a continuing problem in the art to provide objective methods for determining the value of dental hygiene treatment.

For example, the pathological picture of abnormal gingival and periodontal conditions generally shows a stasis or stagnation of the blood circulation in the gingiva. Thus, a primary aim of gingival and periodontal treatment is to eliminate that stasis. If the blood circulation in the gingiva is improved by the treatment, thus eliminating the stasis, the treatment is generally considered to be successful. Accordingly, it is clear that the reactivation of the blood circulation in the gingiva is important to the dental hygiene of the patient. Moreover, massaging of the gingiva has long been recognized as a satisfactory means to reactivate the blood circulation. As the art developed a number of methods and approaches for massaging the gingiva, it became an increasingly important problem in the art to evaluate these methods objectively. Initially, the evaluation of the massaging effectiveness was primarily related to secondary or indirect effects such as: (a) an assessment of the gingiva; (b) the use of biopsies; and (c) the use of exfoliative cytology.

Assessment of the gingiva is an imprecise evaluation since it is primarily subjective. The evaluator will subjectively review the color and texture, such as stippling of the gingiva, as well as subjectively evaluate the bleeding characteristics of the gingiva. While these evaluations provide some indication of the pathological condition of the gingiva, such an evaluation is highly imprecise and quite difficult to use as an objective factor in the judgment of the relative effectiveness of one method of massage or another.

The use of biopsies provides a much more precise method and a more objective method of evaluation than the assessment of the gingiva. However, the image for evaluation presented in biopsies is static, so that the observer could evaluate the anatomical pathological picture, but could not ascertain what treatment had preceded the presentation of the static image. Thus, the use of biopsies is quite difficult in evaluating the extent that massaging is instrumental to produce the picture presented in the biopsies. A second difficulty in the use of biopsies is that biopsies cannot be taken from the same place in the subject at intervals which permit evaluating massaging effectiveness. Moreover, biopsies are devoid of liquids which may often be of importance in evaluating massaging effectiveness. Still further, biopsies do not permit an evaluation of the depth effects of the massage or the direct effects of the massage on the blood vessels but rather can concentrate only on the relative effects of the surrounding tissues.

Evaluation of massaging effects by exfoliative cytology is largely confined to an assessment of the massaging effectiveness on the upper layers of the epithelium. However, a review of the blood circulation rather than the superficial epithelium reaction is of primary interest in the evaluation of massaging effectiveness. Thus, it is preferred that the capillary blood stream, which is the main factor for the well-being of gingival tissues, be studied for massaging effectiveness. Moreover, it is preferred that the capillary blood stream be studied dynamically, not statically, to provide a picture of what occurred before, during, and after the massage. Thus, it is an overall aim of this invention to provide a non-destructive intravital method and apparatus for evaluating massaging effectiveness on blood circulation of a subject.

The art of capillaro-microscopy has permitted in vivo study of capillaries. However, until about 1961, the small magnification achieved by investigators in this art did not permit the study of the corpuscular elements which make up the capillary blood stream. Moreover, inflammation of the elements resulted so that the structure of the capillaries were modified and accordingly, their function effected. While the modified structure could be seen, it was a problem in the art to observe and measure the function of the capillaries. Since the purpose of massaging the gingiva is to stimulate blood flow, the capillaro-microscopic methods generally were not satisfactory.

The development of the art of intravital microscopy has permitted magnification sufficient to study the individual elements of the capillaries. An article by Mutschelknauss and Schumann, "Die Technik der Vitalmikroskopie in der Mundhohle" DZZ, 20, 1965, Heft 8, describes vital microscopic examinations carried out in the oral cavity of a patient by means of a Leitz intravital microscope in connection with the vertical illuminator according to Vonwiller. That publication is herein incorporated by reference.

The art, such as through the efforts of Monro, has also attempted to solve the problem of measuring the velocity of blood flow in a blood vessel by providing a spot of light through a microscope to measure the velocity of blood in capillaries of the skin. This method did not provide any conclusive results because of the difficulty of fixing the correct speed of the spot of light since the experiment was continuous and the virtual impossibility of fixing the spot to a single vessel while the experiments continued. Moreover, since there was no record of the results, it was virtually impossible to reconcile the results.

Accordingly, it is a general object of this invention to provide a method and apparatus to measure the velocity of blood flow in a capillary.

It is an additional object of this invention to provide a method and apparatus to measure the velocity and acceleration of the blood flow in a capillary by non-destructive, intravital techniques.

It is another object of this invention to provide a method and apparatus for measuring the velocity and acceleration of capillary blood flow which is capable of evaluation by different investigators at different times.

It is still an additional object of this invention to provide a method for measuring the velocity and improvement of capillary blood flow cinematographically to evaluate the effect of treatment between the production of two records produced at predetermined intervals.

It is an additional object of this invention to provide a method and apparatus for determining objectively the velocity of an individual element, such as an erythrocyte or a leukocyte in a capillary blood stream by using in vivo, non-destructive techniques.

It is a more general object of this invention to provide a method and apparatus to evaluate objectively and precisely, the merit of the massaging effects of dental massaging agents or devices on the gingiva.

BRIEF SUMMARY OF THE INVENTION

Directed to overcoming the problems of the prior art discussed above and to achieving the objects aforestated, this invention relates to a non-destructive intravital method for measuring capillary blood flow. The method comprises the steps of sensing an area, for example in the gingiva, having blood flow in a capillary to provide a magnified image of the sensed area. The magnified image is continuously recorded by a suitable recording means, for example by a videotape recorder. When the magnified image is reproduced, the velocity of the blood flow is quantitatively sensed.

The method of quantitatively sensing the velocity of the blood flow is preferably provided by generating a spot of light which is capable of traversing the reproduced magnified image of the blood flow and causing the spot to traverse the recorded magnified image at about the same speed of the flow of blood thereon. Thereupon, the velocity at which the spot traverses the recorded magnified image is quantitatively sensed. The spot of light may be caused to traverse the image by either focusing the spot on an erythrocyte or a leukocyte in the blood stream.

The method may also be used to measure the difference in the velocity of the blood flow between two distinct periods of time, a factor which may be used in evaluating the effect of gingival massage. In a preferred embodiment, the area to be sensed is located in the gingiva and the method is further characterized in that after the magnified image is first recorded, the gingival area under study is stimulated by a dental massaging agent, preferably for a period of about two to five seconds. Thereafter, the magnified image of the same gingival area is recorded according to the invention. The difference between the velocity of the blood before and after the massage provides an indication of the effectiveness of the massage.

The apparatus according to the invention comprises a combination of an intravital microscope and a split opaque illuminator for providing a magnified output image of the area under study for recording in a suitable recording medium, such as a videotape recorder. Image playback means, preferably a video playback device reproduces the image for projection upon a suitable screen means. A flying spot scanner for generating a spot of light comprises a source of light in combination with a lens and rotatable diaphragm. Each of the lens and diaphragm includes a recess thereon arranged so that a focusable spot of light is produced for projection at a known rate on the screen. The device is rotatable upon a linking mechanism so that the projected spot of light may be focused upon the image of an erythrocyte or leukocyte on the screen means. Speed control means are provided in combination with one of the rotating members for adjusting its speed, so that the speed of traverse of the projected spot of light on the screen means is approximately that of the leukocyte or erythrocyte. By knowing the speed of rotation of the rotating member, and the magnifications involved in the optics, the velocity of the blood stream may be quantized.

BRIEF DESCRIPTION OF THE DRAWINGS

In the drawings:

FIG. 5 is a side view of the flying spot scanner projecting a spot of light on a screen member; and FIG. 6 is a cross section taken along line 6—6 of FIG. 5.

DETAILED DESCRIPTION OF THE PREFERRED EMBODIMENT

Figure 1:
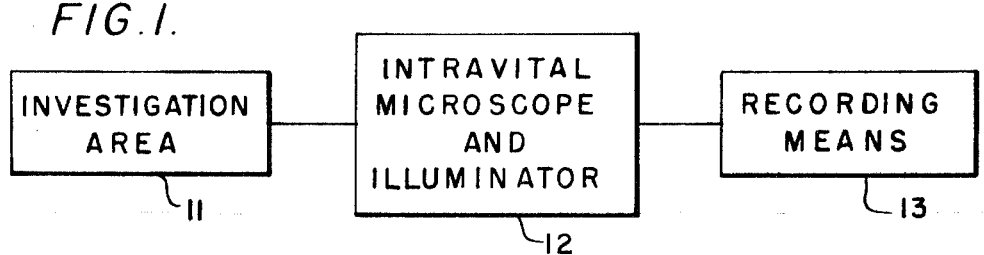
FIG. 1 is a block diagram of the apparatus for practicing the recording aspects of the method according to the invention.

As indicated by the block diagram of FIG. 1, an area of investigation, identified by the reference numeral 11 and having a blood flow therethrough is sensed by the combination of an intravital microscope and a split opaque illuminator, together identified by the reference numeral 12. The output from the intravital microscope and illuminator is recorded by a suitable recording means 13 such as a videotape recorder. The recording means may include a television monitor.

An intravital microscope and split opaque illuminator which are suitable for the practice of the invention are described in a publication identified as Leitz Mitt. Wiss. u. Techn., BD III, Nr 4, S 119–121, Wetzlar, July 1965. Additional detail on intravital microscopic techniques may also be found in an article by Schumann, Journal for Scientific Microscopy and Microscopic Technique, Volume 70, Number 1 (1970). These disclosures are herein incorporated by reference. The technique for vital microscopic examinations in the oral cavity of the patient by means of a Leitz intravital microscope in connection with a vertical illuminator according to Vonwiller is described in the Mutschelknauss and Schumann article, the disclosure of which has previously been incorporated herein by reference.

Figure 2:
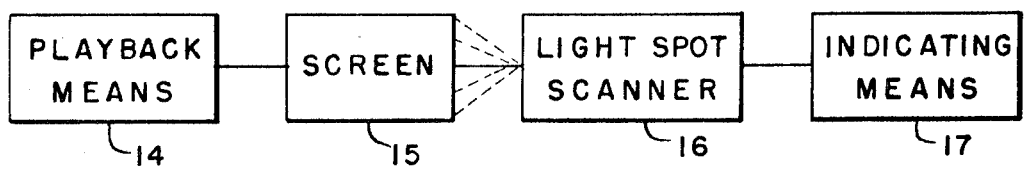
FIG. 2 is a block diagram of the apparatus for practicing the playback steps of the method according to the invention.

As seen in FIG. 2, the recorded magnified image of the areas sensed by the intravital microscope is reproduced by a suitable playback means designated generally by the reference numeral 14 such as a videotape playback device so that the magnified sensed image is reproduced on a screen means, designated generally by the reference numeral 15.

Means 16 are provided for generating a spot of light which is capable of traversing the reproduced, magnified image of the blood flow in the capillary on the screen means 15. The light is caused to traverse the recorded magnified image on the screen means 15 at approximately the same speed as the flow of blood in the reproduced image. When the spot is caused to traverse the screen at about the same speed as the blood flow, the velocity is sensed by indicating means 17 which provides an indication which is capable of being quantized into a figure representing the velocity of blood in the capillary, or which may provide a direct indication of blood speed, such as in millimeters per second.

Figure 3:
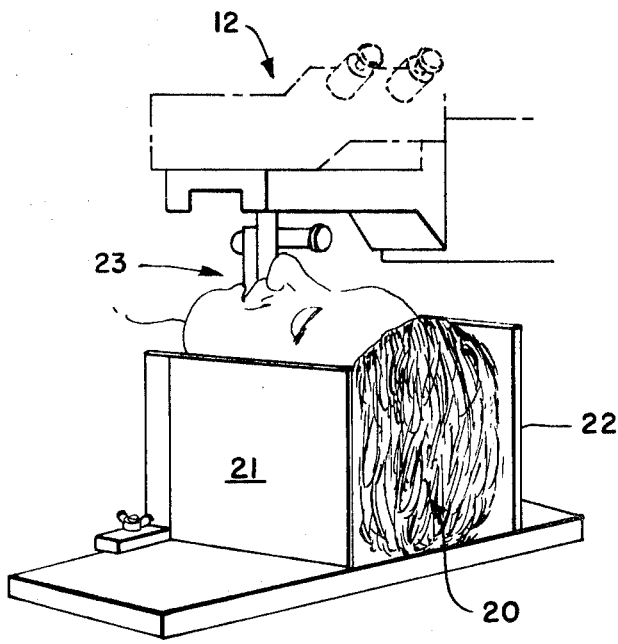
FIG. 3 is a partial view in perspective of the intravital microscope focused on a gingival area in the oral cavity of a patient.

In the preferred embodiment, the area to be investigated is located in the gingiva of a patient, shown in FIG. 3, whose head 20 is positioned in a relatively horizontal position by positioners 21 and 22. A portion of the lens of the intravital microscope 12 is shown located in the mouth 23 of the patient for sensing the gingival area to be studied in a manner described in the publications referred to above. A suitable lens cap (not shown) may be provided to secure the tissue against movement while the tissue is being microscopically investigated.

Figure 4:
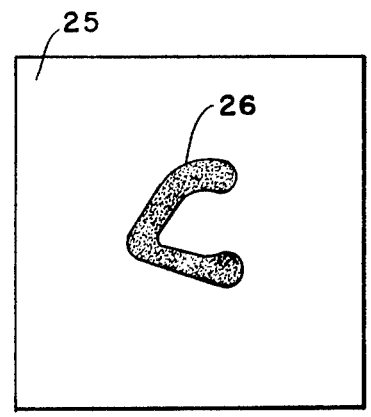
FIG. 4 is a representative diagram showing a magnified image of a capillary in the gingiva magnified by a factor of about 500.

FIG. 4 is an approximation of a capillary in the gingiva of a patient magnified about 500 times. Thus, the gingival area 25 illustrates a blood vessel 26 which represents the area to be studied. With such a technique, it is possible to review the individual cells making up the blood stream and passing through the capillary 26.

Preferably, a suitable vessel or capillary 26 is searched and observed for a suitable period of time, for example about 10 seconds or more, to provide an output image which is recorded via a television camera and a video recorder. Thereafter the area is stimulated by a dental massaging agent for varying lengths of time, but preferably for 2 to 5 seconds which is a practical representation of the length of use by an unsupervised patient. The capillary is then again observed for a suitable period of time, for example, about 6 minutes or more to provide an output image which is also recorded on the video recorder, as described above. The difference between the output representation of the speed of blood in the capillary 26 is indicated by the indicating means 17 before and after stimulation by a dental massaging agent thus provides an indication of the merit of the massaging agent used.

Since the tape may be replayed when necessary by the investigator, and the light spot operated at will, a significant advantage accrues to the invention in that different investigators may review the results, and a permanent record of the effects of the stimulation preserved.

The spot of light from the scanner 16 may be focused on the image 26 and particularly on either a leukocyte or an erythrocyte passing through the capillary 26. By focusing on either a leukocyte or an erythrocyte, the speed of blood may be accurately determined. In the practice of the invention, it may be necessary to playback the recording a number of times in order to sense the velocity of the blood stream by a trial and error technique by repetitively adjusting the speed of the spot produced by the scanner 16. This technique has a particular advantage in that the capillaries in the preferred area of search are quite often irregular in contour, so that the tracing of the blood flow by the scanner must likewise follow in an irregular route.

A suitable device for generating a spot of light for the use in practicing the method according to the invention is designated generally by reference numeral 40 in FIGS. 5 and 6. The scanner 40 includes a housing 41 containing a source of light energy 42 spaced forward of a light reflective element 43. The light from the source 42 is capable of passing through a revolving lens 46 which is capable of focusing a beam 48 of light on a screen 50.

The housing 41 is secured to a support means 52, for example, a tripod to a link 53 which permits the housing to be manually adjustable so that the spot may be focused upon different portions of the screen by the operator. Thus, the link 53 permits motion of the housing 41 about the link 53 so that the light may be projected upon the screen and caused to trace a manually selectable path thereon.

A rotatable diaphragm 60 is spaced between the housing 41 and the revolving lens 46. The diaphragm 60 is driven by a motor 62 and the speed of rotation of the diaphragm 60 is indicated on the indicating means 64. The indicating means 64 correspond to the indicating means 17 described in connection with FIG. 2. As may be best seen in FIG. 6, the diaphragm 60 has a plurality of recesses spaced about the outer periphery thereof. The revolving lens 46 includes a recess 68 generally located on a diameter of the revolving lens 46. The rotation of the diaphragm 60 causes the recesses 66 to periodically intercept the recess 68 so that a beam of light, designated generally by the reference numeral 48, may be projected upon the screen 50.

When the disc 60 rotates and the lens 46 has its slot or recess 68 in a horizontal position as shown in FIG. 6, the beam of light 48 projected upon the screen 50 draws a horizontal trace. In order to provide orientations other than horizontal, the lens 46 may be rotated to draw a correspondingly oriented trace of light on the screen 50. Rotation of the lens 46 provides a fine angular adjustment for causing the light to traverse the capillary in conjunction with the orientation of the system 40 by the use of the link 53.

In the illustration of FIG. 5, a capillary 71 has been shown projected upon the screen and containing a plurality of erythrocytes 72 for purposes of illustration. The spot 73 of light is focused upon the capillary and is caused to traverse the capillary at the same speed as an erythrocyte 72. The speed of traverse of the spot of light generated by the apparatus 40 is controlled by the speed of rotation of the diaphragm 60 which, as described, may be controlled. Thus, the speed of rotation of the diaphragm 60 can be converted directly to an indication of the speed of blood flow in the capillary.

The criteria for objectivity for the analysis of the direct massaging effects on gingival tissue is related to the velocity of the blood stream. An increase of blood velocity increases the nutrition and oxygen provided for gingival tissue so that the relative increase of the velocity of the blood in the gingival tissue provides an objective measure of the worth of stimulation for the tissue.

The invention has been satisfactorily practiced in reviewing gingival capillary structure having a size of about 7 to 20 microns and having a blood flow therethrough measured at a speed of about 1 to 2.5 millimeters per second. The speed of blood in the gingival tissue as determined by the apparatus and method according to the invention has correlated with the measured velocity of blood stream in regenerating tissue determined by other methods known to the art.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A non-destructive method of measuring in vivo blood flow comprising the procedural combination of steps of:
   sensing an area having blood flow therethrough;
   providing a magnified image of said sensed area;
   recording said magnified image for a predetermined period of time;
   reproducing said magnified image; and
   quantitatively determining the velocity of said blood flow from said image while reproducing said magnified image.

2. The method as set forth in claim 1 wherein the step of quantitatively determining is further defined by the steps of:
   generating a spot of light which is capable of traversing the reproduced, magnified image of said blood flow;
   causing said spot to traverse the recorded, magnified image of said blood flow at approximately the same speed as the reproduced flow of blood thereon, and
   quantitatively determining the velocity at which the spot traverses the image.

3. The method as defined in claim 2 wherein the step of causing the spot of light to traverse the image is further defined as including the steps of focusing said spot of light on an erythrocyte in said blood stream and causing said spot to traverse the reproduced, magnified image at about the velocity of travel of said erythrocyte in said blood flow.

4. The method as set forth in claim 2 wherein the step of causing the spot of light to traverse the image is further defined as including the steps of focusing said spot of light on an leukocyte in said blood stream and causing said spot to traverse the reproduced, magnified image at about the velocity of travel of said leukocyte in said blood flow.

5. The method as set forth in claim 2 wherein the steps of sensing, providing and recording are performed to produce a prerecorded representation of a datum velocity of said blood flow, and the steps of sensing, providing and recording are repeated wherein the step of determining further includes the step of determining the difference between the velocity of said blood flow and a prerecorded representation of a datum velocity of said blood flow, thereby to determine directly the effectiveness of massaging said area to increase blood circulation therein.

6. The method as set forth in claim 1 wherein the step of sensing an area to be investigated is further defined in that said area is intravitally sensed by the use of an intravital microscope in combination with a split opaque illuminator.

7. The method as set forth in claim 1 wherein the step of recording said magnified image is further defined as recording a first magnified image and said step of recording is succeeded by the step of massaging said area with a massaging agent and repeating the steps of sensing said area, and recording said magnified image thereby to record a second magnified image.

8. The method as set forth in claim 7 wherein said method further includes the step of quantitatively sensing the velocity of said blood flow while reproducing said second magnified image.

9. The method as set forth in claim 8 further including the step of quantitatively determining the difference between the velocity of said blood flow of said first reproduced image and the velocity of blood flow of said second reproduced image thereby to determine a measure of the effectiveness of said massaging agent.

10. The method as set forth in claim 7 wherein said area is the gingiva, and the step of massaging is further defined in that said gingiva is stimulated by a dental massaging agent.

11. The method as set forth in claim 10 wherein the step of massaging is carried on for a period of time as required for the practical, supervised or unsupervised, use of the massaging device.

12. A non-destructive method of measuring in vivo blood flow from a recorded image comprising the procedural combination of steps of:
    reproducing a first prerecorded magnified image of an anatomical area having blood flow therethrough; and
    quantitatively determining the velocity of said blood flow from said magnified image while reproducing said magnified image.

13. The method as set forth in claim 12 wherein the step of quantitatively determining is further defined by the steps of:
    generating a spot of light which is capable of traversing the first reproduced, magnified image of said blood flow;
    causing said spot to traverse the first recorded, magnified image of said blood flow at approximately the same speed as the reproduced flow of blood thereon; and
    quantitatively determining the velocity at which the spot traverses the first image.

14. The method as defined in claim 13 wherein the step of causing the spot of light to traverse the first reproduced, magnified image is further defines as including the steps of focusing said spot of light on an erythrocyte in said blood stream and causing said spot to traverse the reproduced, magnified image at about the velocity of travel of said erythrocyte in said blood flow.

15. The method as set forth in claim 13 wherein the step of causing the spot of light to traverse the first reproduced, magnified image is further defined as including the steps of focusing said spot of light on a leukocyte in said blood stream and causing said spot to traverse the reproduced, magnified image at about the velocity of travel of said leukocyte in said blood flow.

16. The method as set forth in claim 12 wherein the steps of sensing, providing and recording are performed to produce a prerecorded representation of a datum velocity of said blood flow, and the steps of sensing, providing and recording are repeated wherein the step of quantitatively determining further includes the step of determining the difference between the velocity of said blood flow and a prerecorded representation of a datum velocity of said blood flow, thereby to determine directly the effectiveness of massaging said area to increase circulation therein.

17. The method as set forth in claim 12 further including the steps of:
reproducing a second prerecorded magnified image of said anatomical area, said second image being characterized as having been recorded following a massaging of said anatomical area, said first image being characterized as having been recorded preceding said massaging.

18. The method as set forth in claim 17 further including the step of quantitatively determining the difference between the velocity of said blood flow of said first reproduced image and the velocity of blood flow of said second reproduced image thereby to determine a measure of the effectiveness of the said massaging agent.

19. The method as defined in claim 17 wherein said area is the gingiva, and the step of massaging is further defined in that said gingiva is stimulated by a dental massaging agent.

20. Apparatus for measuring in vivo blood flow comprising:
means for reproducing a first, prerecorded, magnified image of an anatomical area having blood flow therethrough to provide a first reproduced magnified image, and
means for quantitatively determining the velocity of said blood flow from said first reproduced, magnified image while reproducing said image.

21. The apparatus as set forth in claim 20 wherein said means for quantitatively determining the velocity of said blood flow comprises:
means for generating a spot of light;
means for causing said spot of light to traverse the first reproduced magnified image of said blood flow at approximately the same speed as the reproduced flow of blood in said image; and
means for quantitatively determining the velocity at which said spot traverses the first reproduced, magnified image.

22. The apparatus as set forth in claim 20 further including:
means for sensing an anatomical area having blood flow therethrough to provide a magnified image of said area, and
means for recording said magnified image for a predetermined period of time.

23. The apparatus as set forth in claim 22 wherein said sensing means includes a combination of an intravital microscope and a split opaque illuminator.

24. The apparatus as set forth in claim 22 wherein said recording means includes a videotape recorder so that said magnified image is recorded on videotape.

25. The apparatus as set forth in claim 20 further including screen means for receiving said first reproduced magnified image thereon.

26. The apparatus as set forth in claim 25 wherein said determining means characterized in that the velocity of blood flow is sensed from the image reproduced on said screen means.

27. The apparatus as set forth in claim 21 further including screen means for receiving said first reproduced, magnified image thereon and wherein said causing means causes said spot of light to traverse the screen means.

* * * * *